Figure 1:
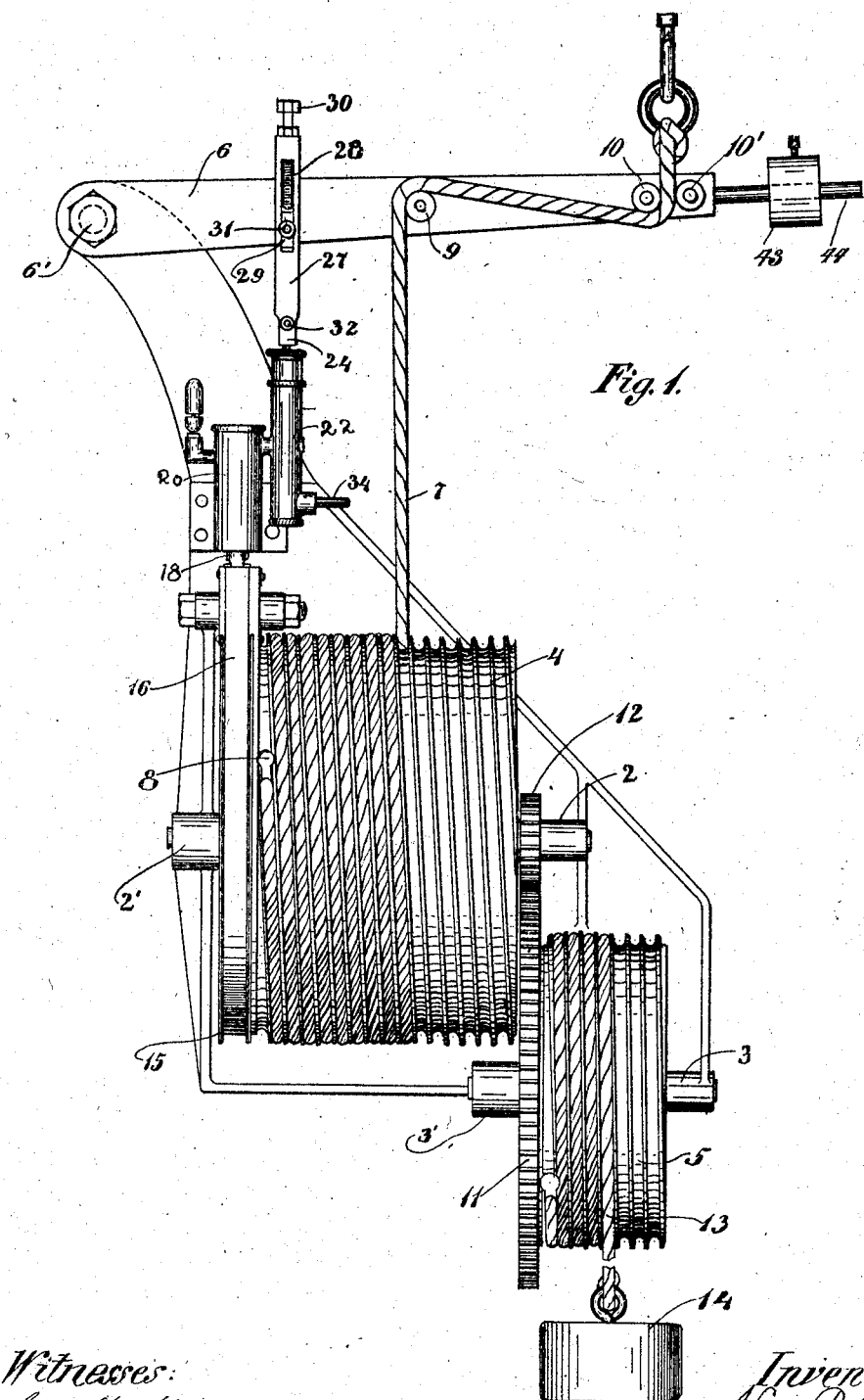

No. 796,295. PATENTED AUG. 1, 1905.
H. B. CLARKE.
COMBINED BRAKE AND TAKE-UP MECHANISM FOR TROLLEYS.
APPLICATION FILED JULY 9, 1904.

3 SHEETS—SHEET 1.

Witnesses:
Geo. M. Mayer.
Albert N. Graves.

Inventor
Henry B. Clarke,
by Offield Towle & Linthicum,
Attorneys.

No. 796,295. PATENTED AUG. 1, 1905.
H. B. CLARKE.
COMBINED BRAKE AND TAKE-UP MECHANISM FOR TROLLEYS.
APPLICATION FILED JULY 9, 1904.

3 SHEETS—SHEET 2.

Witnesses:
Geo. M. Mayer
Albert N. Graves

Inventor
Henry B. Clarke
by Offield Towle & Linthicum
Attorneys

No. 796,295. PATENTED AUG. 1, 1905.
H. B. CLARKE.
COMBINED BRAKE AND TAKE-UP MECHANISM FOR TROLLEYS.
APPLICATION FILED JULY 9, 1904.
3 SHEETS—SHEET 3.
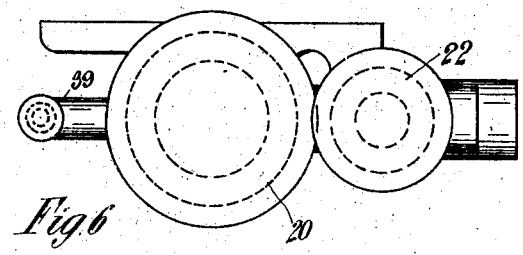
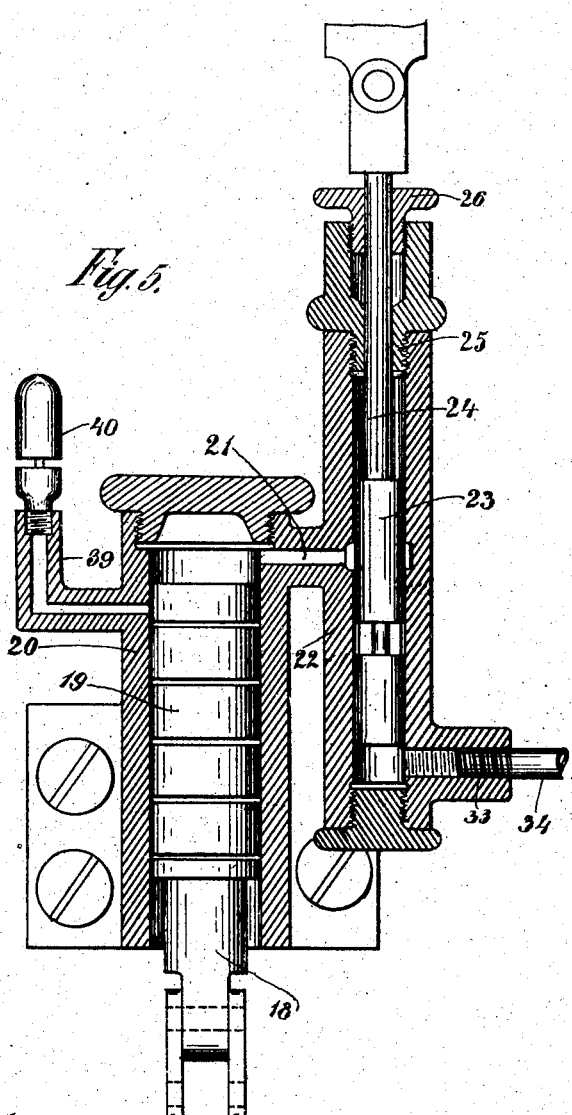
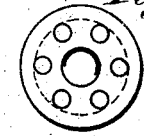
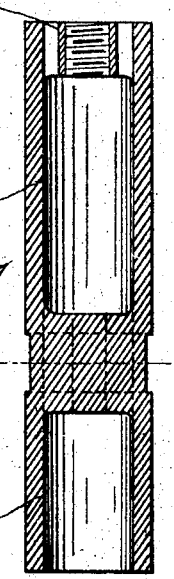
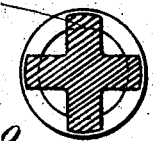
Witnesses:
Geo. M. Mayer
Albert N. Graves
Inventor
Henry B. Clarke
by Offield Towle Linthicum
Attorneys.

UNITED STATES PATENT OFFICE.

HENRY B. CLARKE, OF CHICAGO, ILLINOIS.

COMBINED BRAKE AND TAKE-UP MECHANISM FOR TROLLEYS.

No. 796,295.  Specification of Letters Patent.  Patented Aug. 1, 1905.

Application filed July 9, 1904. Serial No. 215,961.

*To all whom it may concern:*

Be it known that I, HENRY B. CLARKE, a citizen of the United States, residing at Chicago, in the county of Cook and State of Illinois, have invented certain new and useful Improvements in a Combined Brake and Take-Up Mechanism for Trolleys, of which the following is a specification.

This invention relates to improvements in combined brake and take-up mechanisms for trolleys; and it has for its salient objects to provide a mechanism wherein a sudden paying out of the trolley-cord effected by the trolley jumping from the trolley-wire will result in automatically bringing into operation an auxiliary source of power which will lock the controlling mechanism against further movement and prevent the rising of the trolley to such extent as to endanger the cross-wires and overhead supports of the trolley-wire; to provide a construction in which a sudden drawing-out movement of the trolley-cord brings about the operation of the automatic brake, while the comparatively uniform give-and-take movement of the cord does not affect the brake; to provide a construction in which the locking of the brake is effected through a fluid-pressure-actuated device, thereby avoiding the use of ratchets and other non-yielding mechanisms and avoiding the breakage incident to sudden shocks upon the mechanism; to provide in combination with a mechanism of the character last referred to an audible signaling device, which notifies both the motorman and the conductor that the trolley has left the wire, and at the same time said audible signal mechanism is made to serve the purpose of a vent, which permits the ready return of the actuating mechanism to normal position; to provide in an automatic brake mechanism of the character referred to a band-brake and actuating mechanism which will operate to lock the paying-out drum incidentally in any position; to provide in a device of the character referred to a gravity-actuated take-up having a relatively small movement as compared with the movement of the take-up drum proper, whereby the space necessary for the operation of the device is reduced to a minimum, and in general to provide a simple and improved mechanism of the character referred to.

To the above ends the invention consists in the matters hereinafter described, and more particularly pointed out in the appended claims.

The invention will be readily understood from the following description, reference being had to the accompanying drawings, in which—

Figure 3:
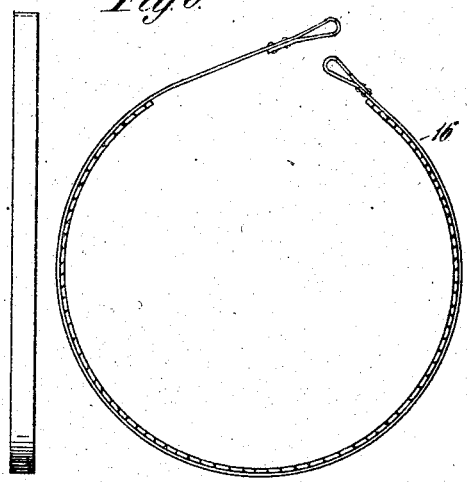
Figure 4:
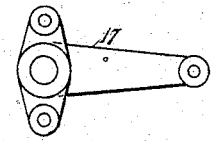
Figure 4:
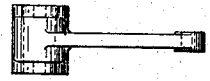
Figure 2:
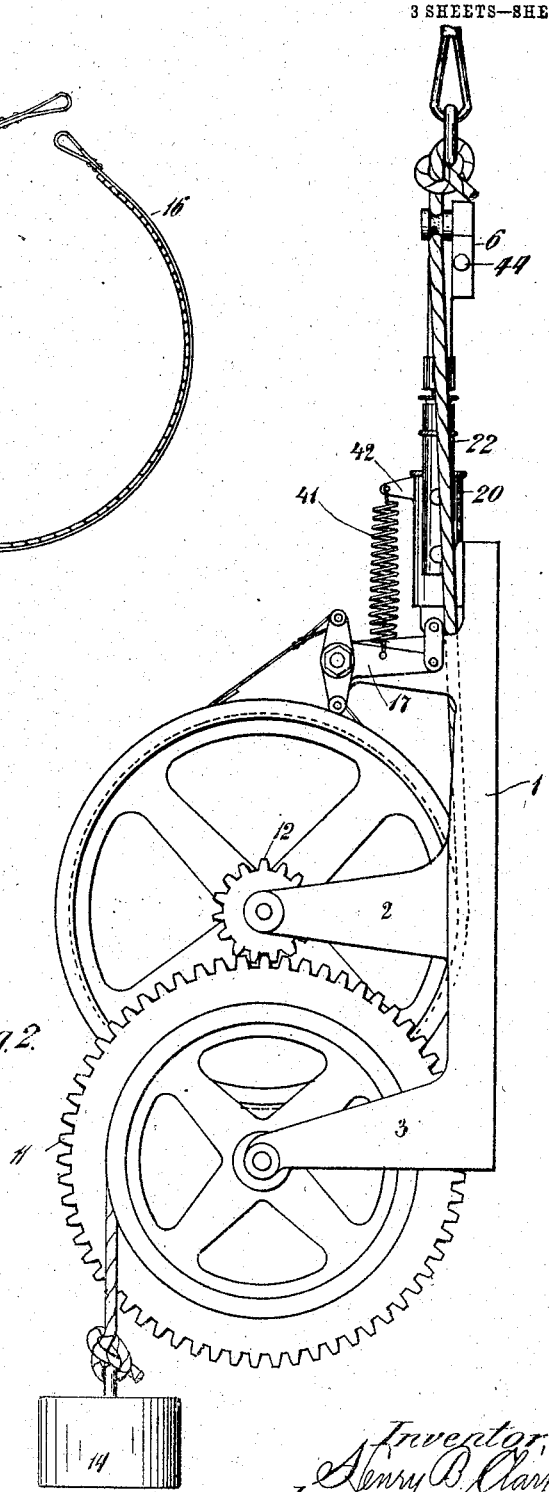

Figure 1 is a view in front elevation of a preferred embodiment of the invention. Fig. 2 is a view in side elevation of the device. Fig. 3 shows edge and side views of the band-brake. Fig. 4 shows edge and side views of the brake-actuating lever. Fig. 5 is a detail sectional view of the fluid-pressure cylinders and connected parts. Fig. 6 is a top plan view of the parts shown in Fig. 5. Figs. 7, 8, and 9 are details of the piston-valve which controls the flow of the air to the main cylinder, Fig. 7 being an axial sectional view, Fig. 8 an end view, and Fig. 9 a cross-sectional view, on line 9 9 of Fig. 7 looking downwardly.

Referring to the drawings, 1 designates as a whole a suitable bracket-like main frame adapted to be secured to the platform-fender of the car or other suitable support and provided with parallel outstanding brackets, as 2 2' and 3 3', between which are journaled a main drum 4 and a controlling-drum 5.

Upon the upper portion of the main frame and arranged to extend transversely above the main drum 4 is pivotally mounted a controlling-lever 6.

7 designates the main trolley-cord, which is at its lower end coiled several times around the main drum and secured thereto, as indicated at 8, the cord being arranged from the drum upward to and around a guide-pulley 9 upon the lever 6, thence along the lever a short distance upwardly between a pair of guide-pulleys 10 10' and to the trolley-pole overhead and not shown. The controlling-drum 5 is arranged to normally exert a winding-up tension of the main drum 5, and to this end a relatively large gear 11 is mounted concentrically upon and rigid with the controlling-drum 5, which gear meshes with a corresponding pinion 12, rigid upon the shaft of the drum 4. The controlling-drum carries a cord 13, coiled thereon and carrying at its lower end a weight 14, which is of such size as to exert a proper winding-up tension on the main drum 4.

Describing now the brake mechanism, upon one end of the main drum 4 is formed a band-groove 15, around which is arranged a band brake-strap 16, having its two ends connected with a T-lever 17, which is mounted upon the main frame, as indicated clearly in Figs. 1 and 2, at a point immediately above the drum. The end of the longer arm of the T-lever is connected with the stem 18 on a drum-piston 19, arranged within the air-cylinder 20, suitably mounted in vertical position upon the main frame. The upper end of the cylinder 20 communicates, through an inlet-passage 21, with the interior of a valve-chamber 22, within which is arranged to reciprocate a slide-valve 23. The valve-chamber 22 is arranged vertically beneath the controlling-lever 6 and at a point between the fulcrum 6' of said lever and its outer end, which carries the trolley-cord, as indicated clearly in Fig. 1. The slide-valve 23 is provided with a stem 24, which extends upwardly and out through suitable gland members 25 26 and connects at its upper end with a link 27, adjustably mounted upon the lever 6. The link 27 is longitudinally slotted, as indicated at 28, and carries within said slot a block 29, which is slidable up and down within the slot, its extent of movement being limited by a screw 30, engaging the block and at its upper end threaded within the upper end of the link, said block being provided with a thumb-screw 31, which extends into the lever 6.

The lower end of the valve-casing 22 is provided with an inlet-nipple 33, with which is connected a pipe 34, leading to any suitable source of air-supply, usually, of course, the air-brake mechanism of the car. The slide-valve 23 is so constructed as to be balanced, and to this end said valve consists of two hollow cylindric shell members 35 and 36, open at their outer ends and connected with each other by means of a solid integral portion 37, which is desirably of cross shape in cross-section, as seen clearly in Fig. 9. An annular interruption between the two cylindric shell members 35 and 36 thus forms an outlet from the interior of the piston to the passage 21, leading to the main cylinder, when the slide-valve is brought into register with said passage. The upper end of the slide-valve is of skeleton construction and is provided with a threaded socket 38 for connection with the stem 24.

As an auxiliary feature I provide a whistle which is arranged to communicate with the main cylinder and is brought into action when the piston 19 of the latter is forced downwardly far enough to throw the brake into operation. In the present instance I have shown the cylinder 20 as provided with a branch pipe 39, which communicates with the cylinder at a point a short distance below the normal position of the upper end of the piston 19, the outer end of said pipe carrying an ordinary steam or air whistle 40. With this arrangement of parts the piston 19 obviously acts as a valve, which opens or closes the whistle-pipe, depending upon the position of the piston.

In order to normally hold the brake free from frictional engagement with the brake-wheel and to hold the main piston 19 at its normal or uppermost limit of movement, a coiled contractile spring 41 is arranged to connect the longer arm of the T-lever 17 with an overhanging bracket 42, carried by the cylinder 20.

In order that the lever 6 shall not be lifted in the ordinary operation of the trolley by the gradual rise and fall of the trolley-pole riding in engagement with the trolley-wire, the said lever is weighted and the weight 43 thereof is conveniently mounted upon an extension 44 upon the swinging end of the lever, said extension being made of uniform diameter, so that the weight may be adjusted therealong.

The operation of the mechanism constructed and arranged as described is probably entirely obvious, but may be briefly described as follows: The weight 14 will be so selected as to take up the slack of the trolley-cord promptly, but nevertheless will not be heavy enough to cause the weighted lever 6 to rise far enough to bring the brake-actuating mechanism into operation, except under the action of a sudden increased pull or jerk, such as results when the trolley-wheel jumps the wire. In other words, the weight 43 of the lever 6 will be adjusted so as to counterbalance the weight 14 and normally hold the lever 6 down. If now the trolley-wheel jumps the wire, the sudden pull on the trolley-cord lifts the end of the lever a substantial distance before the inertia of the weight 14 is overcome, and this sudden lifting of the lever opens the slide-valve, admits fluid-pressure to the top of the cylinder 20, and thus throws the brake into engagement with the winding-drum. This braking operation takes place before the winding-drum rotates to any considerable extent under the sudden pull of the trolley-cord, and the brake-strap grips the drum hard enough to prevent the drum from moving appreciably after the brake is applied. It follows that the trolley-pole will rise only a limited distance necessary to slightly raise the controlling-lever before the brake is applied and further paying-out of the cord prevented. The forcing downward of the piston 19 to apply the brake opens the wheel-pipe and sounds the whistle, thereby notifying the conductor that the trolley is off and requires to be replaced.

While I have herein shown and described what I deem to be a preferred embodiment of my invention, yet it will be obvious that the details of construction and arrangement may be modified without in any sense departing from the invention, and it will also be understood that certain features of the invention are capable of practical use as an operative structure without employing the entire combination described. Accordingly I do not wish to be understood as limiting myself to the details of construction and arrangement shown except to the extent that they are made the subject of specific claims.

I claim as my invention—

1. A brake and take-up mechanism for trolleys comprising a winding-drum, a controlling-lever, a trolley-cord operatively connected with the winding-drum and passing through guides upon the lever located at a point remote from the fulcrum of the lever, a brake mechanism adapted to control the rotation of said winding-drum, a source of auxiliary power arranged to operate said brake mechanism, and means actuated by said lever controlling the application of said auxiliary power to the brake mechanism.

2. In a brake and take-up mechanism, the combination of an automatic take-up device, a trolley-cord connected with said take-up device, a controlling-lever operatively connected with said cord and arranged to hold the latter flexed out of a direct line of draft from the take-up device to the trolley, a band-brake wheel, a band-brake mounted in operative relation thereto, and operative connections between said controlling-lever and band-brake whereby a sudden increased draft on the trolley-cord moves the lever and brings the brake into operation.

3. In a brake and take-up mechanism, the combination of a winding-drum, a gravity-actuated controlling-drum geared to said winding-drum, a controlling-lever, a trolley-cord connected with the winding-drum and operatively engaging said lever, a brake mechanism arranged to control the winding-drum and operative connections between the controlling-lever and brake mechanism.

4. In a mechanism of the character described, the combination of a power-driven winding-drum, a brake arranged to control said winding-drum, a fluid-pressure mechanism comprising a cylinder and a piston relatively connected with the brake mechanism, a source of fluid-pressure, a trolley-cord operatively connected with the winding-drum and trolley, and means operated by said trolley-cord and controlling the admission of fluid-pressure to said cylinder.

5. In a mechanism of the character described, the combination of a winding-drum, a brake mechanism controlling said winding-drum, a fluid-pressure cylinder, a piston in said cylinder, operative connections between said piston and said brake mechanism, a source of fluid-pressure, a valve controlling the admission of pressure to the cylinder, a controlling-lever operatively connected with said valve, and a trolley-cord connected with the winding-drum and with the trolley-lever.

6. In a mechanism of the character described, the combination of a winding-drum, a band-brake arranged to operate upon said winding-drum, a brake-lever connected with said band-brake, a fluid-pressure cylinder, a piston in said cylinder, operative connections between said piston and brake-lever, a valve arranged to control the admission of pressure to said cylinder, a controlling-lever, operative connections between said controlling-lever and admission-valve, a trolley-cord operatively connected with the winding-drum and controlling-lever, and a spring normally holding the brake mechanism out of operation.

7. A brake and take-up mechanism, comprising a take-up device, a cord operatively connected therewith, a brake arranged to control said take-up device, a fluid-pressure cylinder and piston arranged to operate said brake, an admission-valve, means operatively connected with the cord for operating said admission-valve, and an annunciator operatively connected with the fluid-pressure mechanism.

8. A combined brake and take-up mechanism, comprising a main winding-drum, a gravity-actuated controlling-drum geared to said winding-drum, a controlling-lever fulcrumed at one end, a trolley-cord connected with the winding-drum and with the swinging end of the lever, a band-brake arranged to act upon said winding-drum, fluid-pressure cylinder, a piston in said cylinder operatively connected with said band-brake mechanism, a valve-casing communicating with said cylinder, a slide-valve therein, operative connections between said slide-valve and the controlling-lever, and a spring arranged to normally hold the brake out of operative position and the piston of the fluid-pressure cylinder retracted.

HENRY B. CLARKE.

Witnesses:
ALBERT H. GRAVES,
L. F. MCCREA.